Sept. 17, 1968 T. J. HARRIS 3,402,297
OPTICAL DISTRIBUTION NETWORK
Filed May 10, 1965 3 Sheets-Sheet 1

INVENTOR
THOMAS J. HARRIS
BY Ralph C. Dustin
ATTORNEY 3,402,297
OPTICAL DISTRIBUTION NETWORK
Thomas J. Harris, Poughkeepsie, N.Y., assignor to International Business Machines Corporation, Armonk, N.Y., a corporation of New York
Filed May 10, 1965, Ser. No. 454,369
13 Claims. (Cl. 250—199)

ABSTRACT OF THE DISCLOSURE

Apparatus is provided for accomplishing the selective transferral of information between any two of a plurality of transmission lines. Parallel optical links, each containing light deflecting apparatus are operative in response to indications from a seeking line and a sought line to effect bidirectional connection between the lines for information transfer. Line scanners also respond to the indications from the seeking and sought lines to act through control and switching circuitry to activate the deflecting apparatus.

This invention relates to information handling systems and more particularly to systems in which light beams are employed for switching and transmitting information between different points.

The handling of information between different points at high speed is accomplished in present day practice by time sharing or time division multiplexing. This permits an exchange of information between a large number of communication terminals simultaneously. Each pair of terminals between which information is to be transmitted has a frequently recurring time period during which a bit of information may be either sent or received. When sampling takes place at a sufficiently rapid rate and a proper filtering of information is employed, an accurate reproduction of information transmitted at one terminal may be reproduced at the other.

It is customary practice to use in communication systems a hybrid connection in which the line to each subscriber terminates. Such connections include hybrid coils for connecting both transmission and reception paths to each line and also include a filter and gate needed for both transmission and reception. As shown in Patent 1,981,999 issued Nov. 27, 1934, to N. R. French, two transmission lines are connected to hybrid coils between which parallel paths are provided for the transfer of information. Arranged in each path is an element emitting light corresponding to the information transmitted from one line and acting upon a photoelectric cell connected to the other line. By providing between the light transmitting elements and the photoelectric cells some apparatus for deflecting the light beams at high speed from elements of any selected lines successively to the photoelectric cells of other selected lines, it is possible to obtain a transfer of information simultaneously between different pairs of line terminals.

An object of this invention is to provide an improved apparatus for transferring information selectively between any two of a plurality of transmission lines.

Another object is to provide an improved system for providing connections between different pairs of transmission lines on a time sharing basis.

Yet another object is to provide in a system employing light beams for conveying information, apparatus for deflecting the light beams so as to connect different lines in communication with each other and continually switching the connections at high speed so the connections recur frequently on a time sharing basis.

Still another object is to provide an improved system in which light beams are deflected to provide parallel paths over which information may be transmitted in opposite directions between a pair of lines, said system including switches which are each effective to control the deflection of light in both paths.

The foregoing and other objects, features and advantages of the invention will be apparent from the following more particular description of the preferred embodiments of the invention, as illustrated in the accompanying drawings.

Figure 1:
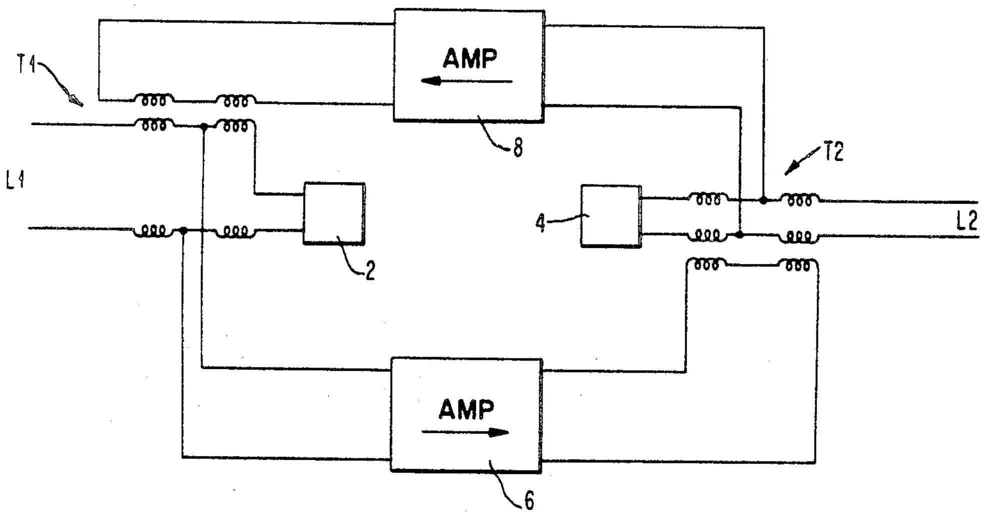
FIG. 1 PRIOR ART
FIG. 1 is a schematic diagram of conventional telephone apparatus connected for two-way transmission of information.

An ordinary two-wire circuit is sometimes sufficient for the transmission of voice messages in either direction. When amplification is required to compensate for circuit losses, however, it is necessary that two one-way paths be provided because of the unidirectional nature of amplifiers. A conventional telephone circuit providing amplification includes, as shown in FIG. 1, two hybrid coils or transformers $T_1$ and $T_2$ in which lines $L_1$ and $L_2$ terminate. Balancing networks 2 and 4 are connected to the transformers and present impedances equal to those of the corresponding line sections. A bypass circuit including an amplifier 6 picks up signals from line $L_1$ and delivers them amplified to line $L_2$. Another bypass circuit including an amplifier 8 delivers amplified signals from line $L_2$ to line $L_1$.

Figure 2:
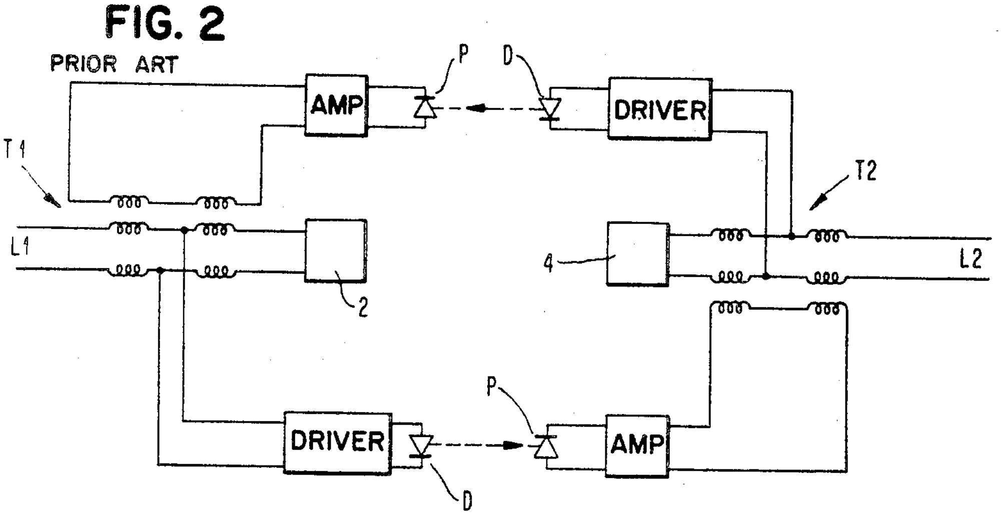
FIG. 2 PRIOR ART
FIG. 2 is like FIG. 1 but employs light beams for transmitting information.

FIG. 2 shows a system like that of FIG. 1 except for each bypass circuit in which there is substituted in place of each amplifier 6 and 8, a light emitting diode D energized from a driving circuit and directing light upon a photosensitive device P which delivers pulses through an amplifier to one of the hybrid transformers. This arrangement is substantially like that shown in Patent 1,981,999 to N. R. French. When a plurality of circuits like that of FIG. 2 are arranged so that a light deflector can be located in the paths of light beams for corresponding bypass circuits, it is possible to deflect the light beams in a manner to connect any pair of lines in communication with each other. With electro-optic devices energized in different combinations by the closing of switches for connecting different pairs of lines in communication, the operation of the switches may be controlled by memories in which the addresses of the lines to be connected are stored. Advancing the addresses through memory at a megacycle rate results in a connection of different pairs of lines serially so that a bit of information may be transmitted between them during each brief period of connection. The light deflectors may be designed for handling any number of lines, and the number of line pairs that can be connected for simultaneous transfer of information depends on the capacity of the memories.

Figure 3:
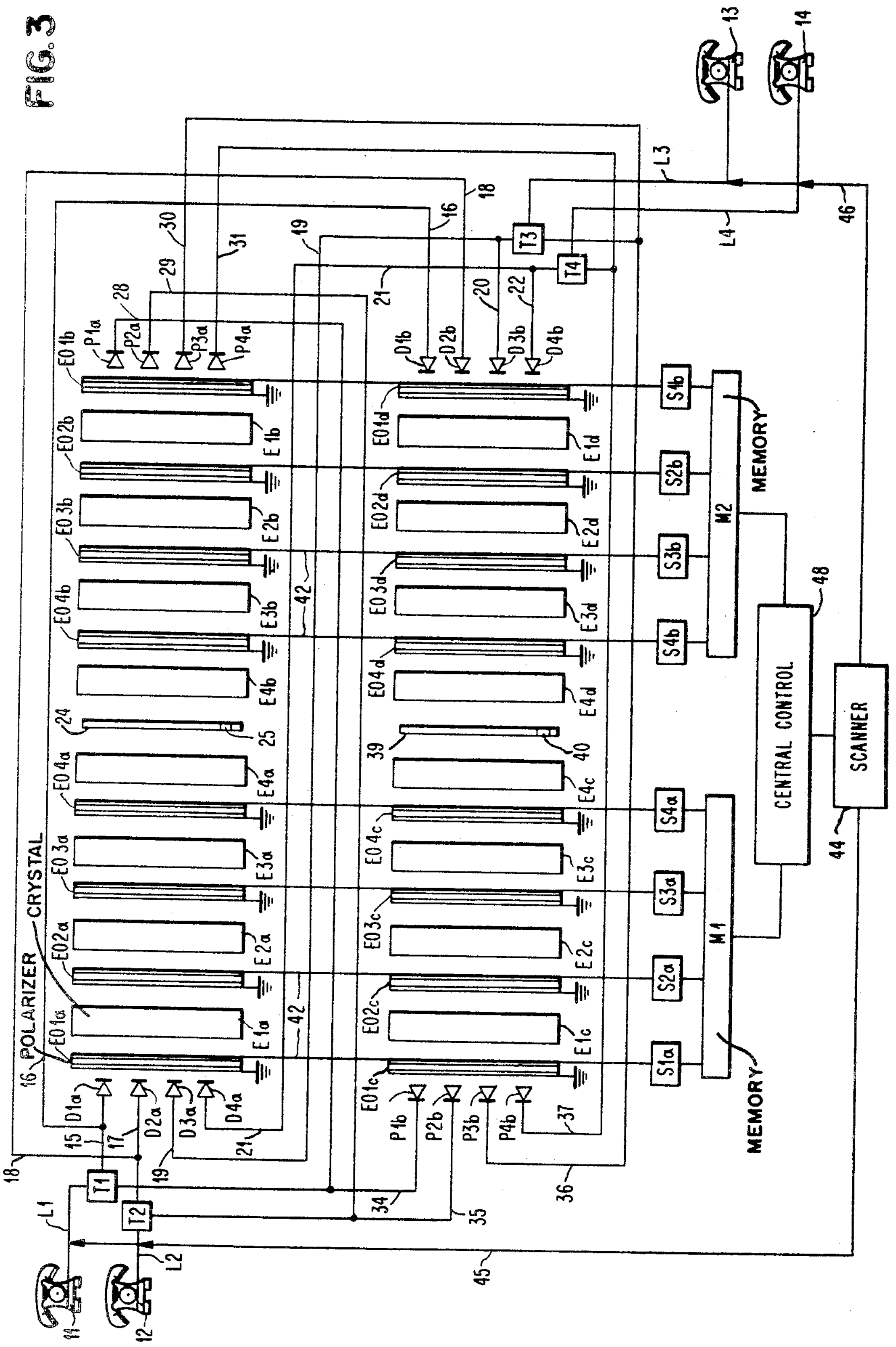
FIG. 3 is a schematic diagram of a system similar to that of FIG. 2 but includes a plurality of stations and means for deflecting the light beams to provide selective connections between the stations.

Referring to FIG. 3 it will be noted that there is shown a system which is adapted for connecting the lines of any two telephones in communication by means of light deflectors. There are shown only four telephones, 11, 12, 13 and 14, but more could be added by increasing the number of light deflection elements in a manner which will become obvious shortly. The telephones 11, 12, 13 and 14 are connected respectively through lines $L_1$, $L_2$, $L_3$ and $L_4$ to hybrid transformers $T_1$, $T_2$, $T_3$ and $T_4$ like those shown in FIGS. 1 and 2. Signals passing over line $L_1$ to transformer $T_1$ cause electric pulses to be applied over conductor 15 to a light emitting diode $D_{1a}$ and over conductor 16 to a light emitting diode $D_{1b}$. Pulses from transformer $T_2$ are applied by conductor 17 to diode $D_{2a}$ and by conductor 18 to diode $D_{2b}$. Transformers $T_3$ and $T_4$ are connected in the same manner by conductors 19 and 21 to diodes $D_{3a}$ and $D_{4a}$ as well as by conductors 20 and 22 to diodes $D_{3b}$ and $D_{4b}$.

Arranged in horizontal alignment along the path of light beams from the diodes $D_{1a}$ to $D_{4a}$ are elements $E_{1a}$ to $E_{4a}$ and (in reverse order) $E_{4b}$ to $E_{1b}$ made of a birefringent material through which linearly polarized light passes either as an ordinary ray without deflection or as an extraordinary ray with deflection depending on the direction in which the plane of polarization extends. The thickness of each element in the light path determines the spacing between the ordinary ray and the extraordinary ray at the output side. All of the elements are made of equal thickness so the amount of deflection taking place in any element is of unit value. The elements $E_{1a}$ to $E_{4a}$ have their optic axes oriented in such a direction that the extraordinary rays are deflected downwardly while the elements $E_{1b}$ to $E_{4b}$ are oriented to effect a deflection of the same rays upwardly.

At the input sides of the elements $E_{1a}$ to $E_{4a}$ are electro-optic devices $EO_{1a}$ to $EO_{4a}$ which normally pass linearly polarized light without affecting it in any way but which operate when energized to rotate the plane of polarization by 90 degrees assuming that a half wave voltage is applied. Located at the output sides of the elements $E_{1b}$ to $E_{4b}$ are electro-optic devices $EO_{1b}$ to $EO_{4b}$ which also operate when energized to rotate the plane of polarization by 90 degrees. Each electro-optic device includes an electro-optic material, such as a potassium dihydrogen phosphate crystal, and a transparent electrode at each side. Arranged between the birefringent elements $E_{4a}$ and $E_{4b}$ is a plate 24 which blocks the passage of light except through an opening 25 adjacent its lower end. This opening is located in such a position that light from diode $D_{1a}$ must be deflected downwardly four units to be in line with the opening. Diode $D_{2a}$ is spaced one unit distance below diode $D_{1a}$ so its light would have to be deflected three units to pass through the opening 25. Diodes $D_{3a}$ and $D_{4a}$ are spaced from each other and from diode $D_{2a}$ by unit distances so they require deflections of two units and one unit, respectively, to pass light through the opening 25.

As mentioned above, the birefringent elements $E_{1b}$ to $E_{4b}$ deflect the extraordinary light rays upwardly. At the output side of the electro-optic device $EO_{1b}$ are photosensitive devices $P_{1a}$ to $P_{4a}$ arranged in alignment with their corresponding light emitting diodes $D_{1a}$ to $D_{4a}$. In order for a light beam to reach one of the devices $P_{1a}$ to $P_{4a}$ from the opening 25, it must be deflected upwardly from one to four units. When a light beam acts upon the devices $P_{1a}$ to $P_{4a}$, electric pulses are delivered by way of conductors 28, 29, 30 and 31 to transformers $T_1$, $T_2$, $T_3$ and $T_4$, respectively.

Arranged in horizontal alignment along the paths of light from diodes $D_{1b}$ to $D_{4b}$ are birefringent elements $E_{1c}$ to $E_{4c}$ and $E_{1d}$ to $E_{4d}$, these elements being like their corresponding elements $E_{1a}$ to $E_{4a}$ and $E_{1b}$ to $E_{4b}$. Light from the diodes $D_{1b}$ to $D_{4b}$ passes in the opposite direction, however, and is deflected downwardly in elements $E_{1d}$ to $E_{4d}$ and upwardly in elements $E_{1c}$ to $E_{4c}$. Electro-optic devices $EO_{1c}$ to $EO_{4c}$ and $EO_{1d}$ to $EO_{4d}$ are arranged at the same sides of their associated birefringent elements as the electro-optic devices for the elements $E_{1a}$ to $E_{4a}$ and $E_{1b}$ to $E_{4b}$. Since the light passes in the opposite direction from the diodes $D_{1b}$ to $D_{4b}$, the electro-optic devices $EO_{1d}$ and $EO_{4d}$ will be at the input sides of their associated birefringent elements while the electro-optic devices $EO_{1c}$ to $EO_{4c}$ will be at the output sides of the elements $E_{1c}$ to $E_{4c}$. At the output side of the device $EO_{1c}$ are photosensitive devices $P_{1b}$ to $P_{4b}$ arranged in horizontal alignment with the diodes $D_{1b}$ to $D_{4b}$, respectively. The photosensitive devices $P_{1b}$ to $P_{4b}$ are connected respectively by conductors 34, 35, 36 and 37 to transformers $T_1$ to $T_4$. Between the birefringent elements $E_{4c}$ and $E_{4d}$ is a plate 39 which blocks the passage of light except through an opening 40 located one unit distance below the line between diode $D_{4b}$ and the photosensitive device $P_{4b}$.

One electrode of each electro-optic device is connected to ground and the other electrodes associated with the upper row of deflecting elements are connected by conductors 42 to the other electrodes at corresponding locations in the lower row. In addition to this, the ungrounded electrodes of the electro-optic devices $EO_{1c}$ to $EO_{4c}$ are connected to switches $S_{1a}$ to $S_{4a}$ while the same electrodes for the electro-optic devices $EO_{1d}$ to $EO_{4d}$ are connected to switches $S_{1b}$ to $S_{4b}$, respectively. A memory $M_1$ controls the operation of switches $S_{1a}$ to $S_{4a}$ while another memory $M_2$ controls switches $S_{1b}$ to $S_{4b}$.

A scanner 44 continually scans all of the lines through conductors 45, 46 and detects the removal of a phone from its hook as well as the dialing of a number from such telephone. The scanner is connected to a central control 48 which operates on reception of information from the scanner to store in memory $M_1$ the binary address of a line making a call and to store in memory $M_2$ at a corresponding location, the binary address of the line being called. The addresses are circulated through the memories $M_1$ and $M_2$ at high speed and close the switches $S_{1a}$ to $S_{4a}$ and $S_{1b}$ to $S_{4b}$ in accordance with the addresses stored at corresponding locations. With the arrangement shown, the lifting of a telephone on one of the lines $L_1$ to $L_4$ results in the closing of a corresponding switch $S_{1a}$ to $S_{4a}$. The dialing of the number for any one of lines $L_1$ to $L_4$ results in the closing of the corresponding switch $S_{1b}$ to $S_{4b}$.

To describe the operation of the system assume that the telephone for line $L_1$ is lifted and the number for line 3 is dialed. The scanner detects the lifting of the telephone and provides central control with information to effect a storing at some location in memory $M_1$ a binary address to cause the closing of switch $S_{1a}$ at some time during the circulation of addresses in memory. Scanner 44 also detects the dialing of the number for line $L_3$ and provides central control with information to effect a storing in memory $M_2$, at a location corresponding to that of the calling address in memory $M_1$, an address which causes the closing of switch $S_{3b}$ simultaneously with the closing of switch $S_{1a}$.

When the stored addresses have been advanced in memories $M_1$ and $M_2$ to effective positions, switches $S_{1a}$ and $S_{3b}$ close to energize the electro-optic devices $EO_{1a}$, $EO_{1c}$, $EO_{3b}$ and $EO_{3d}$. It will be assumed that the light emitted from all of the diodes $D_{1a}$ to $D_{4a}$ and $D_{1b}$ to $D_{4b}$ is polarized in a plane to pass through all of the birefringent elements without deflection. Signals from line 1 are delivered by transformer $T_1$ over conductor 15 to diode $D_{1a}$ and also over conductor 16 to diode $D_{1b}$. Light from diode $D_{1a}$ has its plane of polarization rotated 90 degrees by the electro-optic device $EO_{1a}$ so the light beam is deflected downwardly one unit in the birefringent element $E_{1a}$. Since none of the electro-optic devices $EO_{2a}$, $EO_{3a}$ and $EO_{4a}$ are energized to return the polarization to its original plane, the light beam is deflected downwardly one unit in each of the elements $E_{2a}$, $E_{3a}$ and $E_{4a}$ so it passes through the opening 25 to be deflected upwardly one unit by each of the elements $E_{4b}$ and $E_{3b}$. The light now passes through the energized electro-optic device $EO_{3b}$ and has its plane of polarization rotated 90 degrees so the light passes without further deflection to the photosensitive device $P_{3a}$. During the same time, light from diode $D_{1b}$ passes through elements $E_{1d}$ and $E_{2d}$ without deflection but then is acted upon by the electro-optic device $EO_{3d}$ to effect a downward deflection in elements $E_{3d}$ and $E_{4d}$. The total downward deflection is insufficient, however, to reach opening 40 and so the light is blocked by the plate 39. Pulses from the photosensitive device $P_{3a}$ pass over conductor 30 to transformer $T_3$ and then out on line $L_3$.

Signals from line $L_3$ are directed by transformer $T_3$ over conductors 19 and 20 to diodes $D_{3a}$ and $D_{3b}$. Light from diode $D_{3b}$ passes through elements $E_{1d}$ and $E_{2d}$ without deflection but then has its polarization direction rotated by the electro-optic device $EO_{3d}$ so it is deflected in elements $E_{3d}$ and $E_{4d}$ to pass through the opening 40. Light from the diode $D_{3a}$ cannot reach the opening 25 since it is deflected downwardly by each of the elements $E_{1a}$ to $E_{4a}$. After the light passes through the opening 40 it is deflected upwardly in each of the elements $E_{4c}$, $E_{3c}$, $E_{2c}$ and $E_{1c}$. Electro-optic device $EO_{1c}$ then rotates the light polarization to its original plane but this is ineffective since there are no more birefringent elements to pass through. The photosensitive device $P_{1b}$ is then acted upon by the light and emits pulses over conductor 34 to transformer $T_1$ and line $L_1$. It will be noted that information from line $L_1$ was transmitted through the upper row of deflectors to line $L_3$ while information from line $L_3$ was transmitted through the lower row of deflectors to line $L_1$. The switch setting controlling the passage of information through the upper row of deflectors also controls the passage of information through the lower row of deflectors. Connections may be made between any pair of lines and, in each case, the line initiating the call is connected through the upper row of deflectors by closing the one of the switches $S_{1a}$ to $S_{4a}$ corresponding to the number of the line calling and closing the one of the switch $S_{1b}$ to $S_{4b}$ corresponding to the number of the line called. The same closing of switches connects the called line to the calling line through the lower row of deflectors.

All of the apparatus involved is capable of operating at megacycle rates to connect different pairs of lines in communication with each other. With such speeds of operation, there would be, of course, many more than the number of lines shown. To increase the number of lines it would be necessary to make a corresponding increase in the light deflecting elements when using the system of FIG. 3.

Figure 4:
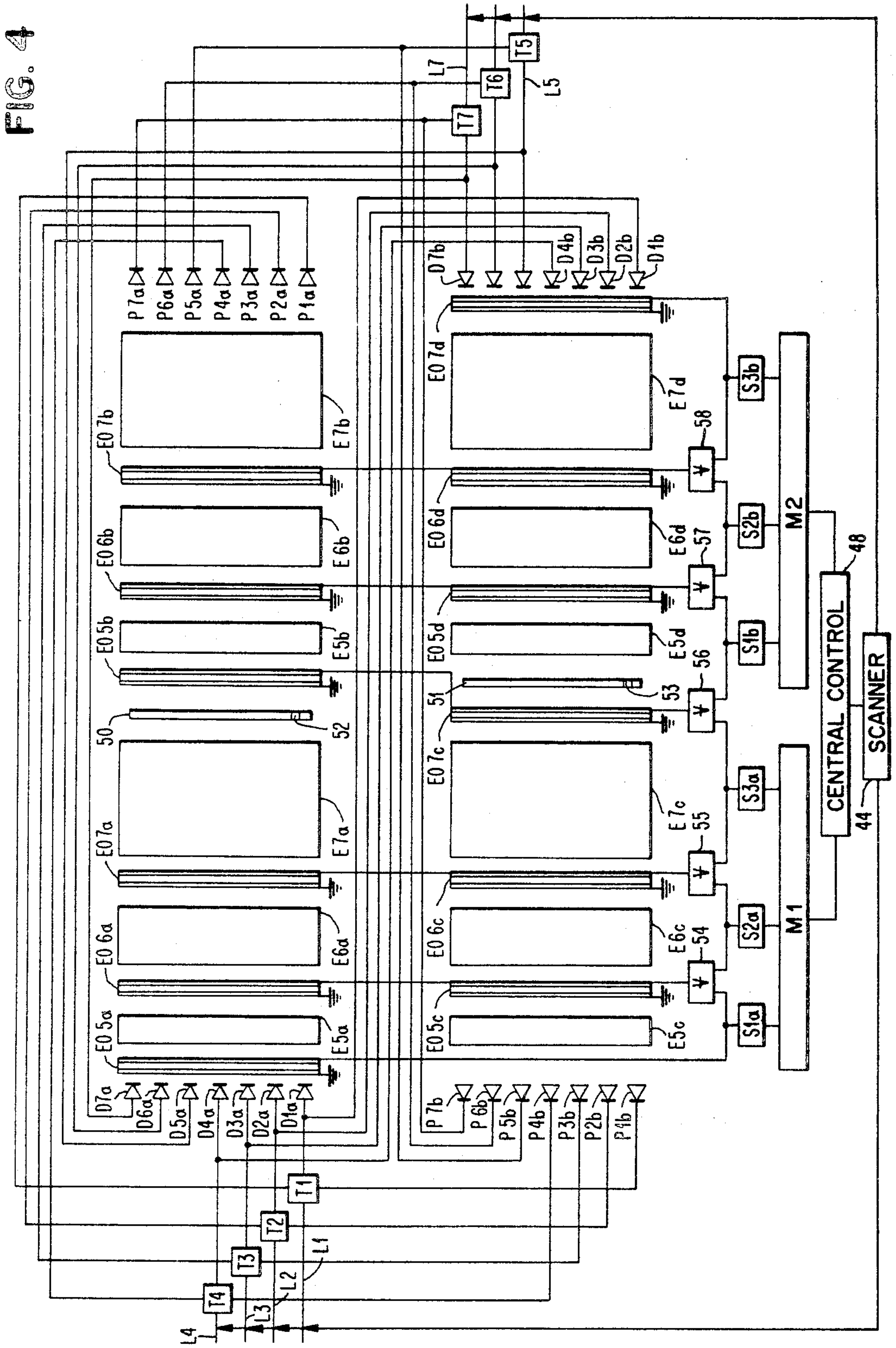
FIG. 4 is a schematic diagram of a system similar to that of FIG. 2 but employing a different arrangement of light deflecting apparatus.

A modification of the invention shown in FIG. 4 is better adapted to a system in which a large number of lines are to be connected in communication with each other. In this modification, an upper row of light deflectors includes one set of birefringent elements $E_{5a}$, $E_{6a}$ and $E_{7a}$ increasing in thickness by a factor of two and a second set of similar elements $E_{5b}$, $E_{6b}$ and $E_{7b}$ also increasing in thickness by a factor of two. Electro-optic devices $EO_{5a}$, $EO_{6a}$, $EO_{7a}$, $EO_{5b}$, $EO_{6b}$ and $EO_{7b}$ are located at the input sides of their corresponding elements. A lower row of deflectors also includes two sets of birefringent elements, one set designated $E_{5c}$, $E_{6c}$ and $E_{7c}$ while the other is designated $E_{5d}$, $E_{6d}$ and $E_{7d}$. Electro-optic devices $EO_{5c}$, $EO_{6c}$, $EO_{7c}$, $EO_{5d}$, $EO_{6d}$ and $EO_{7d}$ are located at the input sides of their corresponding birefringent elements, these sides being opposite from those of the top row since the light passes them in the opposite direction.

Light beams are deflected in the birefringent elements amounts varying directly with their thickness. Since this increases by a factor of two, the deflection in element $E_{5a}$ is one unit while deflections in elements $E_{6a}$ and $E_{7a}$ are two units and four units, respectively. The same is true for the other sets of elements. Orientation of the elements is the same as in FIG. 3 to cause deflection both upwardly and downwardly in the same manner. It will be seen that seven lines may be used with this arrangement since the maximum units of light deflection is equal to seven. At the left end of the upper row of deflectors are light emitting diodes $D_{1a}$ to $D_{7a}$ separated from each other by one unit of deflection and with $D_{1a}$ in the lower most position. At the right end of the lower row of deflectors are light emitting diodes $D_{1b}$ to $D_{7b}$ arranged in the same order as the diodes $D_{1a}$ to $D_{7a}$. Lines $L_1$ to $L_7$ are connected through transformers $T_1$ to $T_7$ to diodes $D_{1a}$ to $D_{7a}$ and $D_{1b}$ to $D_{7b}$, respectively. At the right end of the upper row of deflectors are photosensitive devices $P_{1a}$ to $P_{7a}$ connected through transformers $T_1$ to $T_7$ with lines $L_1$ to $L_7$, respectively. Other photosensitive devices $P_{1b}$ to $P_{7b}$ at the left end of the lower row of deflectors are also connected through transformers $T_1$ to $T_7$ with lines $L_1$ to $L_7$. Between the two sets of deflectors in the upper and lower rows are plates 50 and 51 which block the flow of light but have openings 52 and 53 through which light may pass at positions one unit distance below the level of diodes $D_{1a}$ and $D_{1b}$, respectively.

Associated with the birefringent elements $E_{5a}$ to $E_{7a}$ and $E_{5c}$ to $E_{7c}$ are switches $S_{1a}$, $S_{2a}$ and $S_{3a}$.

Switch $S_{1a}$ is connected directly to one electrode of the electro-optic device $EO_{5a}$ and is connected through an "exclusive-or" circuit 54 to both of the electro-optic devices $EO_{5c}$ and $EO_{6a}$. Switch $S_{2a}$ is also connected through the "exclusive-or" circuit 54 to the electro-optic devices $EO_{5c}$ and $EO_{6a}$ as well as through an "exclusive-or" circuit 55 to electro-optic devices $EO_{6c}$ and $EO_{7a}$. Switch $S_{3a}$ is connected through the "exclusive-or" circuit 55 to electro-optic devices $EO_{6c}$ and $EO_{7a}$ and also through an "exclusive-or" circuit 56 to electro-optic devices $EO_{7c}$ and $EO_{5b}$. It will be noted that each switch may be closed to effect a deflection of light only in the elements with which the switch is associated. Switches $S_{1b}$, $S_{2b}$ and $S_{3b}$ are associated with the birefringent elements $E_{5b}$ to $E_{7b}$ and $E_{5d}$ to $E_{7d}$ and control the deflection of light within them by energizing their electro-optic devices either directly or through "exclusive-or" circuits 57 and 58.

When only switch $S_{1a}$ of the first switch group is closed, the electro-optic device $EO_{5a}$ is energized directly and the electro-optic devices $EO_{6a}$ and $EO_{5c}$ are energized through the "exclusive-or" circuit 54. Light from diode $D_{1a}$ has its direction of polarization rotated by the electro-optic device $EO_{5a}$ to effect deflection of the light beam downwardly one unit. With the device $EO_{6a}$ energized, the light polarization is rotated to its original plane and no further deflection takes place. This light beam is now at a level to pass through the opening 52. Light from any one of the other diodes $D_{2a}$ to $D_{7a}$ would be blocked by the plate 50. If switch $S_{2b}$ of the second switch group is the only one closed, the light from opening 52 passes without deflection until it reaches the electro-optic device $EO_{6b}$. Here its direction of polarization is rotated 90 degrees so that a deflection upwardly of two units takes place in the element $E_{6b}$. The electro-optic device $EO_{7b}$ is also energized from switch $S_{2b}$ and rotates the plane of polarization to effect a passage of light without deflection to the photosensitive device $P_{2a}$. Pulses from device $P_{2a}$ are conducted through transformer $T_2$ to line $L_2$. Information from line $L_2$ is transmitted through transformer $T_2$ to diode $D_{2b}$ which emits light polarized in a direction to pass without deflection through the birefringent elements. As this light passes through the device $EO_{6d}$ its polarization is rotated to cause deflection downwardly two units in element $E_{6d}$. Device $EO_{5d}$ then rotates the polarization direction again so the light passes straight through the element $E_{5d}$ and the opening 53. The light continues to pass without deflection through elements $E_{7c}$ and $E_{6c}$. Electro-optic device $EO_{5c}$ is energized from switch $S_{1a}$ and acts on the light to effect its deflection upwardly one unit in element $E_{5c}$. This light acts on the photosensitive device $P_{1b}$ to cause an emission of pulses through transformer $T_1$ to line $L_1$.

When any two or more switches not adjacent to each other are closed, the electro-optic devices on both sides of each corresponding birefringent elements are energized so deflection takes place only within each element. If switches corresponding to two adjacent birefringent elements are closed, the electro-optic devices at the outer sides of the two elements are energized but there is no output from the "exclusive-or" circuit connected to the electro-optic devices between the elements. Deflection of light therefore takes place in both elements. Switches $S_{1a}$ to $S_{3a}$ and $S_{1b}$ to $S_{3b}$ may be assigned values equal to the deflection values of the elements with which they are associated. Connection of any pair of lines is then effected by closing those switches $S_{1a}$ to $S_{3a}$ whose sum of assigned values is equal to the number of the line initiating the call and closing the switches $S_{1b}$ to $S_{3b}$ whose sum of assigned values is equal to the number of the line called. The closing of switches is effected by memories $M_1$ and $M_2$ in the same manner as in FIG. 3. Scanner 44 scans the lines $L_1$ to $L_7$ to detect the lifting of a phone from its hook as well as the dialing of a number. Information passed from the scanner to central control 48 results in a storing of the address for the calling line in some location in memory $M_1$ and a storing of the address for the called line in a corresponding location in memory $M_2$.

The memories $M_1$ and $M_2$ in FIGS. 3 and 4 may consist of magnetic cores, discs, drums or any similar apparatus having address locations which may be circulated at high speed and effect the closing of switches in accordance with the addresses stored. The capacity of the systems may be increased by increasing the number of birefringent elements and their associated apparatus. With a system like that of FIG. 4, the capacity could be greatly increased with the addition of a comparatively small number of birefringent elements. The capacity may be great enough to connect, for example, one thousand lines and yet the memories $M_1$ and $M_2$ could be much smaller since there probably would never be an occasion when all of these lines would need to be connected in pairs. If each memory had only fifty locations at which addresses could be stored, then it would be possible to connect one hundred lines in pairs for transmission of information. With the address positions circulating through memory at a megacycle rate, the bits of information sampled from each pair of lines are sufficient to provide simultaneous transmission of information over all one hundred lines.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Switching apparatus for connecting any two of a plurality of lines in two-way communication comprising, in combination, parallel optical paths over which information may be passed in opposite directions, light emitting devices located at the input ends of each of said paths, light responsive devices located at the output ends of each of said paths, means outside of said parallel optical paths for interconnecting each of said lines to said light emitting devices and said light responsive devices at corresponding positions in each path, and light deflecting means arranged in each of said paths and substantially juxtaposed between said light emitting devices and said light responsive devices and operable to direct light from only any one of said light emitting devices at its input end to only any one of said light responsive devices at its output end.

2. The apparatus of claim 1 in which said light deflecting means in each path includes two groups of light deflecting elements, each of said groups of elements being capable of digitally deflecting a light beam, said light emitting devices being in alignment with said light responsive devices connected to corresponding lines and being spaced from each other unit distances in the direction of light deflection, and means for blocking the passage of light between said two groups of deflecting elements except as it is deflected to a predetermined point.

3. The apparatus of claim 1 in which said light deflecting means in each path includes two groups of elements made of a birefringent material and arranged so the light from said light emitting devices associated with said path passes through them serially to said light responsive devices, an electro-optic device at the input side of each of said elements in said group adjacent said light emitting devices, an electro-optic device at the output side of each of said elements in said group adjacent said light responsive devices, means for blocking the passage of light between said two groups of elements except as it is deflected to a predetermined point, said light emitting devices operating on reception of signals from their associated lines to emit light polarized in a plane to pass through said birefringent elements without deflection, said electro-optic devices operating when energized to rotate the plane of light polarization 90 degrees, and means for selectively energizing said electro-optic devices.

4. The apparatus of claim 3 in which each of said birefringent elements is capable of deflecting a light beam only a one unit distance.

and the elements of one group are oriented to effect a deflection of light in one direction while the elements of the other group are oriented to effect a deflection of light in the opposite direction.

5. The apparatus of claim 3 in which said means for energizing said electro-optic devices includes means electrically connecting said electro-optic devices in each group of one path with corresponding electro-optic devices of the opposite groups in the other path, and means including switches which are selectively operable for energizing simultaneously the electro-optic devices in one path and the electro-optic devices to which they are connected in the other path.

6. The apparatus of claim 1 in which said light deflecting means includes a plurality of elements made of a birefringent material.

an electro-optic device associated with each of said elements and operable when energized to effect a change in the path of light passing through following elements, and means for energizing said electro-optic devices so as to direct light between corresponding light emitting devices and light responsive devices in each of said paths.

7. The apparatus of claim 1 in which said light deflecting means in each path includes two groups of elements made of a birefringent material and arranged so the light from said light emitting devices associated with said path passes through them serially.

an electro-optic device at the input side of each of said elements in both of said paths, means for blocking the passage of light between said two groups of elements in each path except as it is deflected to a predetermined point, said light emitting devices operating on reception of signals from their associated lines to emit light polarized in a plane to pass through said birefringent elements without deflection, said electro-optic devices operating when energized to rotate the plane of light polarization 90 degrees, and means for selectively energizing said electro-optic devices.

8. The apparatus of claim 7 in which said means for selectively energizing said electro-optic devices includes means electrically connecting said electro-optic devices at the input sides of said birefringent elements in both groups of one path with the electro-optic devices at the output sides of the birefringent elements in opposite groups of the other path, an "exclusive-or" circuit for controlling the energizing of each pair of said electro-optic devices which are electrically connected, and means including switches for selectively energizing said electro-optic devices, said last mentioned means including conductors connecting each of said switches to said "exclusive-or" circuits controlling the energizing of electro-optic devices at the opposite sides of a different one of said birefringent elements.

9. The apparatus of claim 7 in which said elements of birefringent material in each group vary in thickness by a factor of two.

10. The apparatus of claim 9 in which said birefringent elements in both groups of one path increase in thickness in the direction of light flow while said birefringent elements in both groups of the other path decrease in thickness in the direction of light flow.

11. The apparatus of claim 1 in which said light deflecting means includes elements of birefringent material arranged so that light passes through them serially, an electro-optic device associated with each of said elements, means including switches operable to energize said electro-optic devices in any selected combination, and means including a memory having circulating binary address locations in which the binary addresses of lines may be stored for controlling the operation of said switches.

12. Switching apparatus for connecting different pairs of lines serially in two-way communication comprising, in combination, parallel optical paths over which information may be passed in opposite directions, light emitting devices located at the input ends of said paths, light responsive devices located at the output ends of said paths, means outside of said parallel optical paths for interconnecting each of said lines to respective ones of said light emitting devices and said light responsive devices at corresponding positions in each path, a plurality of elements in each of said paths and substantially juxtaposed between said light emitting devices and said light responsive devices for directing light from said light emitting devices to said light responsive devices, an electro-optic device associated with each of said elements for controlling its effectiveness in directing light, means including switches for energizing said electro-optic devices in selected combinations, and means including a memory having circulating binary address locations in which the binary addresses of lines may be stored for controlling the operation of said switches.

13. The apparatus of claim 12 in which said elements in each path are divided into two groups, and a separate memory for controlling the switches to said electro-optic devices associated with each group, one of said memories receiving binary addresses for one line of each pair and the other memory receiving binary addresses for the other line of each pair.

References Cited

UNITED STATES PATENTS

| | | | |
|---|---|---|---|
| 1,981,999 | 11/1934 | French | 179—15 |
| 3,223,784 | 12/1965 | Hiroshi | 179—15 |
| 3,290,619 | 12/1966 | Gensic. | |
| 3,329,474 | 7/1967 | Harris | 350—157 |

ROBERT L. GRIFFIN, *Primary Examiner.*

A. MAYER, *Assistant Examiner.*